Sept. 14, 1954   R. W. SPAFFORD   2,688,931
CURRENT SUPPLY AND CONTROL MEANS FOR TRAVELING CONVEYERS
Original Filed Aug. 5, 1944   3 Sheets-Sheet 1

Inventor
Ralph W. Spafford
BY
Thiess, Olson + Mecklenburger
Attorneys.

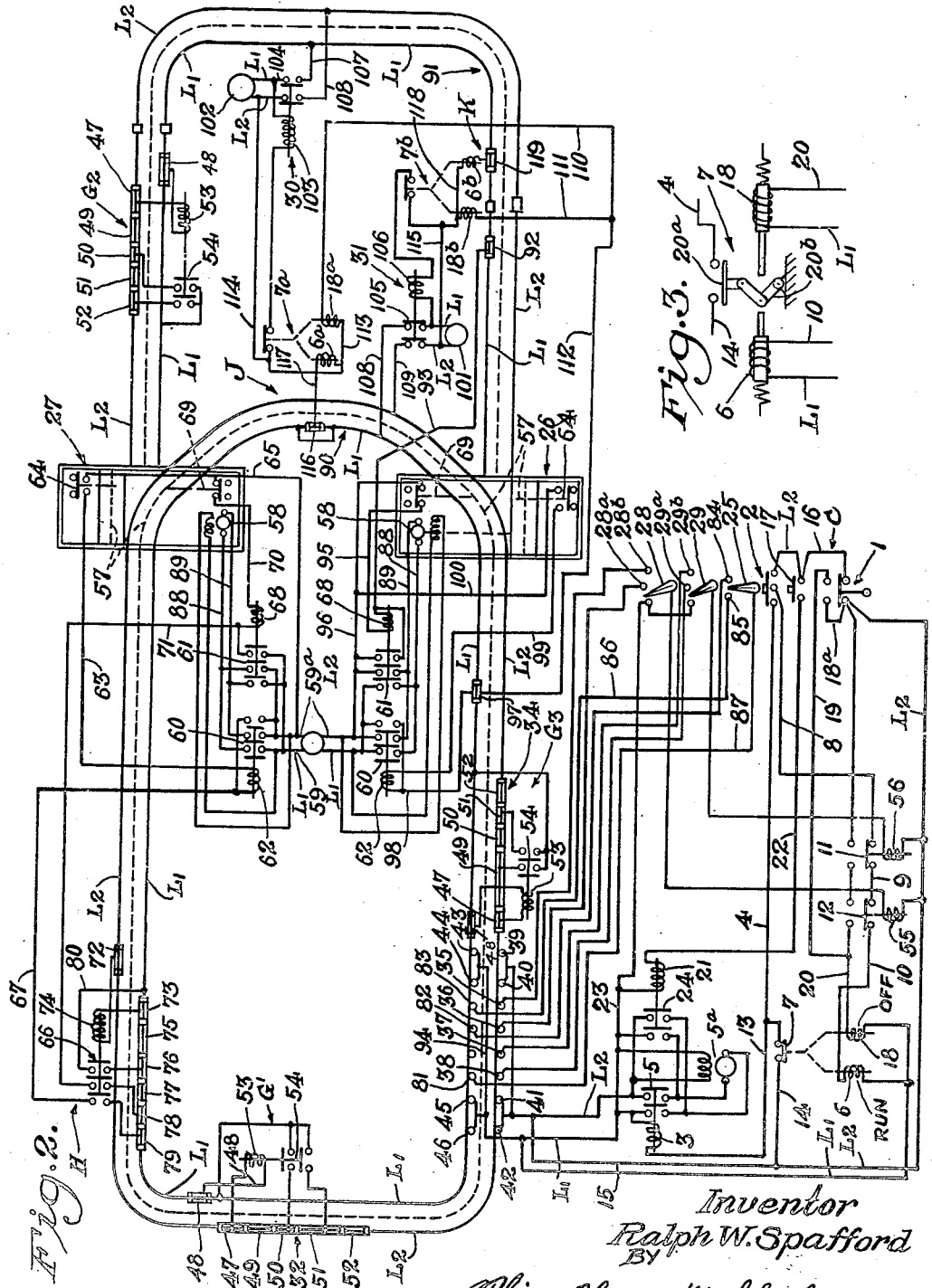

Sept. 14, 1954  R. W. SPAFFORD  2,688,931
CURRENT SUPPLY AND CONTROL MEANS FOR TRAVELING CONVEYERS
Original Filed Aug. 5, 1944  3 Sheets-Sheet 3

INVENTOR.
RALPH W. SPAFFORD

BY
Thiess, Olsen & Mecklenburger
ATTORNEYS.

Patented Sept. 14, 1954

2,688,931

UNITED STATES PATENT OFFICE 2,688,931

CURRENT SUPPLY AND CONTROL MEANS FOR TRAVELING CONVEYERS

Ralph W. Spafford, Fairfield, Iowa, assignor, by mesne assignments, to Mechanical Handling Systems, Inc., Detroit, Mich., a corporation of Michigan Continuation of application Serial No. 18,694, April 2, 1948, which is a continuation of application Serial No. 548,193, August 5, 1944, now both abandoned. This application January 17, 1950, Serial No. 139,061

29 Claims. (Cl. 104—88)

1

My invention relates to travelling conveyor constructions and apparatus.

This application is a continuation of my co-pending application Serial No. 18,694, filed April 2, 1948, which is a continuation of my application Serial No. 548,193, filed August 5, 1944, both of which prior applications have become abandoned.

One of the objects of my invention is to provide in a travelling conveyor construction in which the conveyor is propelled along a trackway, improved means whereby the attendant at a station along the trackway can set selective means on the conveyor so that it will automatically stop at any stop station along the trackway which the dispatcher may desire.

A further object is to provide such a construction in which the trackway is provided with a plurality of selectable routes in which the attendant at a station along the trackway can set selector means on the conveyor so that it will automatically control the routing of the conveyor as determined by the dispatcher.

A further object of my invention is to provide such a construction in which interference between a plurality of conveyors is prevented.

A further object is to provide such constructions in which the control is effected by the use of collectors which engage the power bus bars of the system.

A further purpose of my invention is to provide an improved telepher system having a route including differentiated bus bar sections for track switch controls for cooperation with a plurality of differential conveyor carried collectors, some of which will automatically throw certain of the switches and not others and some of which will not throw said certain switches and will throw others.

A further object is to provide an improved telepher system having a route including bus bar sections for stop stations for cooperation with differentiated conveyor carried collectors, some of which conveyors will automatically stop at certain stations and not at others and some of which will not automatically stop at said certain stop stations and will stop at others.

Further objects and advantages of the invention will be apparent from the description and claims.

In the drawings,

Fig. 2 shows a wiring diagram of the system;

2

Figure 4:
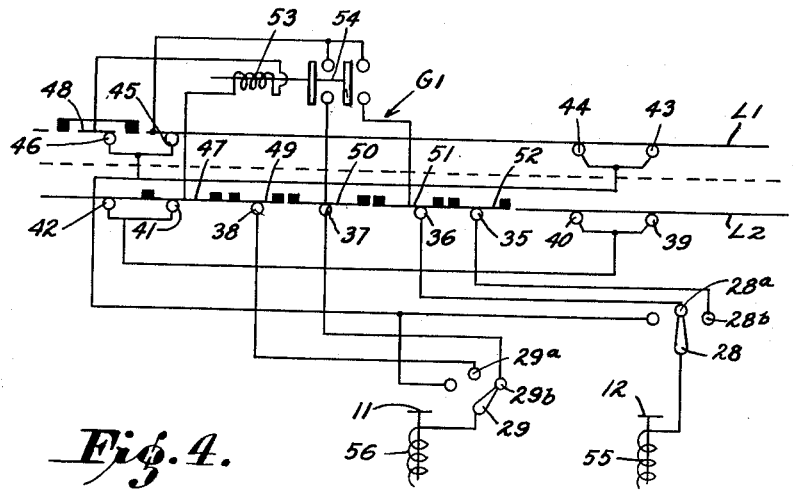
Figure 5:
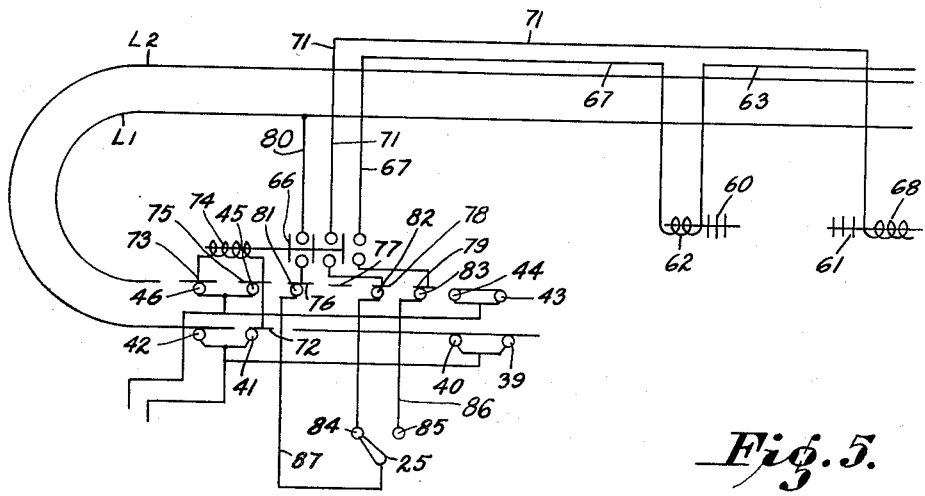

Fig. 3 is a detail view of a latched in switch used;

Fig. 4 is a somewhat diagrammatic view showing the conveyor collectors in engagement with the propulsion motor bus bar stop sections, and Fig. 5 is a somewhat diagrammatic view showing the track switch controlling collectors in engagement with the track switch controlling bus bar sections.

Figure 1:
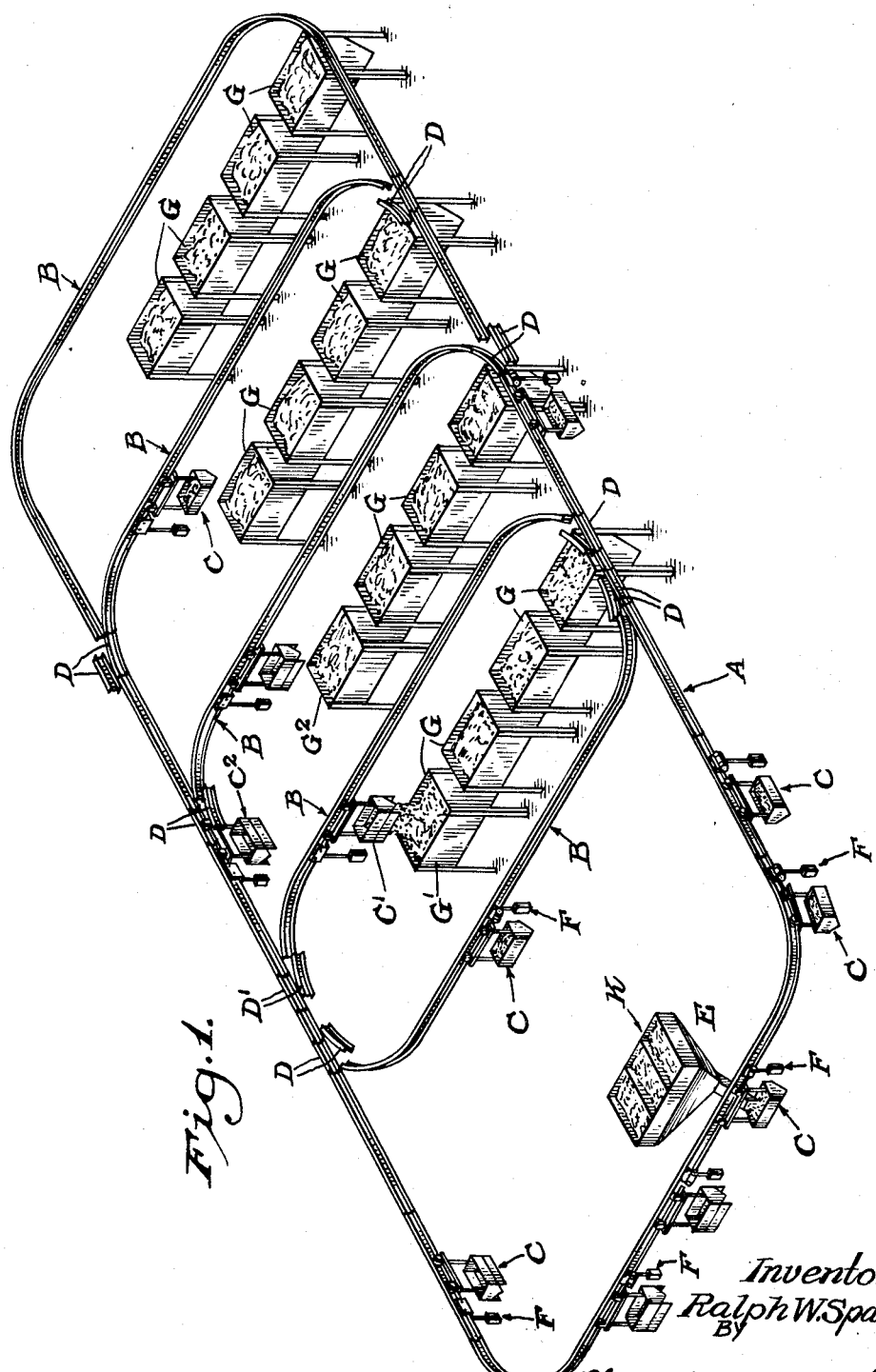
Figure 1 is a somewhat diagrammatic perspective view of a conveyor system.

Before describing the construction in detail, I will outline the operation broadly in connection with the disclosure of Fig. 1. The construction therein shown comprises a trackway A having a plurality of selectable routes B in which the routing of the conveyors C is controlled by means of track switches D, which, as shown, can be set either so that the conveyor will travel straight ahead or will travel on a curve onto a branch track section B.

In the construction shown means are provided so that a dispatcher at the station E can set a selector F carried by a conveyor C so that when the conveyor is dispatched on its way, it will control the route-determining switches D in such a manner that it will travel along any desired one of the branch trackways and so that it will stop at any desired one of the stop stations G along the branch trackways. Means are also provided to prevent interference between conveyors such as $C^1$ and $C^2$ which may both be approaching the same switch $D^1$. This is accomplished by providing blocking stations so that the conveyor which reaches its blocking station first will cut off the power to the travel motor on the other conveyor.

Referring now to Fig. 2, the construction shown provides for manual starting, stopping, and reversing the travel motor $5^a$, selective travel motor stop, selective track switch operation, and selective conveyor blocking. By reason of the selective track switch apparatus, a circuit controller 25 on the conveyor may be so set that as the trolley travels along the trackway, it will control the operation of the routing track switches 26 and 27 in such a way as to guide the conveyor to the desired area. By reason of the selective travel motor stop apparatus, selective circuit controllers 28 and 29 on the conveyor may be so set that the conveyor will stop in any desired area of the selected trackway and at any desired section of the selected area. By reason of the selective blocking apparatus 30 and 31, if two conveyors are travelling along the trackway, the one having precedence may cause the de-energization of the bus bars supplying power to the travel motor $5^a$ of the other conveyor, thus avoiding conflicting control of the track switches 26 and 27 and possible collision or derailment of the conveyors.

As outlined above, manually operated means are provided for manually controlling the forward and reverse travel of the conveyor and for the stopping of the conveyor travel. Usually each conveyor carries a hoist motor and control (not shown).

Manual starting of travel motor

When the stop switch 1 is in lowered position and the dispatcher closes the forward switch 2, a circuit is closed between $L^1$ and $L^2$ through the forward travel motor switch actuator 3. The travel motor $5^a$ is then put in operation for forward travel of the conveyor by the switch 5. At the same time a circuit is closed from $L^1$ to $L^2$ through the "run" actuator 6 for the latched-in switch 7 (shown in detail in Fig. 3), through the conductors 8, 9 and 10 and switches 11 and 12. A holding circuit is thus established through the actuator 3 for the forward travel motor switch 5 between $L^1$ and $L^2$ through the conductors 13, 14 and 15, thus maintaining the motor $5^a$ running and keeping the conveyor travelling after the dispatcher releases the forward switch 2.

Manual stop for travel motor

When an attendant raises the stop switch 1, it opens the circuit 16, breaking the connection between $L^2$ and both the forward switch 2 and the reverse switch 17, and establishes a circuit between $L^1$ and $L^2$ through the "stop" actuator 18 for the latched-in switch 7 and the conductors $18^a$, 19 and 20. This opens the switch 7 to break the circuit through the actuator 3 for the forward travel motor switch 5 and causes the travel motor switch 5 to open the circuit to the travel motor $5^a$ and stop the travel motor and conveyor.

The latched-in switch apparatus shown in more detail in Fig. 3 comprises the switch terminals for the conductors 4 and 14, the circuit controller $20^a$ for connecting and disconnecting these terminals, a toggle mechanism $20^b$ for actuating the controller $20^a$ and the actuators 6 and 18. When the actuator 6 is energized even momentarily, it straightens the toggle $20^b$ to hold the switch closed until the actuator 18 is energized. When the actuator 18 is energized, it breaks the toggle to hold the switch open until the actuator 6 is again energized.

Manual reversing travel motor

When the motor has been stopped by the opening of the motor switch 5, closing the reverse switch 17 will close a circuit between $L^1$ and $L^2$ through the reverse motor switch actuator 21 and the conductors 22 and 23, thus closing the reverse switch 24 and causing reverse travel of the conveyor.

Selective control for stopping travel motor

The apparatus for selectively controlling the stopping of the travel motor $5^a$ comprises manually settable selective circuit controllers 28 and 29 carried by the conveyor and a plurality of selectable apparatus 32, 33, and 34 of predetermined setting located at different stop stations along the trackway which are either accepted or rejected by the settable apparatus on the conveyor and the acceptance and rejection of which determines whether or not the trolley travel motor will be stopped at the selectable station.

The selective apparatus on the conveyor comprises in addition to the circuit controllers 28 and 29 and the analyzing collectors 35, 36, 37 and 38 selectable thereby, conditioning trolley collectors 39, 40, 41, 42, 43, 44, 45 and 46 for cooperation with interposed conditioning bus bar sections 47 and 48 at the various stop stations $G^1$, $G^2$ and $G^3$ along the trackway. These conditioning collectors are also the collectors for the power supply for the propulsion motor $5^a$. The controllers 28 and 29 operate conjointly in accepting or rejecting the various stop stations. By means of the controller 28, the actuator 55 controlling the switch 12 can be connected through the switch contacts $28^a$ and $28^b$ with either the collector 35 or 36, and by means of the controller 29 the actuator 56 controlling the switch 11 can be connected through the switch contacts $29^a$ and $29^b$ with either the collector 37 or with the collector 38. If the conveyor motor $5^a$ is running, the switch 7 being closed, it requires the simultaneous raising of both switches 11 and 12 to stop the motor by de-energizing the actuator 6 and energizing the actuator 18, thus opening the switch 7. This simultaneous raising of both switches 11 and 12 is dependent on the selection of analyzing collectors made by the selectors 28 and 29, as explained hereinafter.

When the conveyor has moved to analyzing position with respect to stop station $G^1$ as shown in detail in Fig. 4, in which position the conditioning collectors 42 and 45 engage the bus bar sections 47 and 48, respectively, the cooperating conditioning means on the conveyor C and the various stop stations $G^1$, $G^2$ and $G^3$ render effective for analysis by the selected analyzing collectors certain of the various analyzable interposed bus bar sections 49, 50, 51 and 52. This is accomplished by energizing the actuator 53, connected between the bus bar sections 47 and 48, which closes the switch 54. The energization of the actuator 53 when the conveyor is in conditioning position is accomplished by the collector 42 and the collectors 39 and 40 electrically connected therewith which connect the section 47 with the bus bar $L^2$ and by the collector 45 and the collectors 43 and 44 electrically connected therewith which connect the insulated bus bar section 48 with the bus bar $L^1$. As the actuator 53 is thus electrically connected between the bus bars $L^1$ and $L^2$, the switch 54 is closed to render effective for analysis the analyzable bus bar sections 50 and 51 at station $G^1$, for example.

The closing of the switch 54 connects a predetermined number of the analyzable bus bar sections 49, 50, 51 and 52 (for example, 50 and 51, at stop station $G^1$, 50 and 52 at stop station $G^2$, and 49 and 51 at stop station $G^3$) with the other bus bar $L^1$. These analyzable sections 49, 50, 51 and 52 are positioned and spaced so that when the conveyor has moved to analyzing position, they will be in contact, respectively, with the analyzing collectors 38, 37, 36 and 35.

Assuming that the conveyor is at stop station $G^3$ and the attendant desires to dispatch it and have it stop at station $G^1$, as shown in Fig. 4, he will set the selector control 28 to connect the actuator 55 with the collector 36 and will set the selector control 29 to connect the actuator 56 with the collector 37. He will then start the conveyor on its way by momentarily depressing the forward push button 2. When the conveyor reaches the analyzing position for stop station $G^1$, the conditioning collectors 42 and 45 engage the bus bar sections 47 and 48, respectively, connecting them with L¹ and L², respectively, and thus energizing the actuator 53. This closes the switch 54, connecting the analyzable elements 50 and 51 with L¹. These analyzable elements are now engaged by the collectors 37 and 36, respectively. As the selector contacts 28 and 29 have been set to connect the actuators 55 and 56 with the collectors 36 and 37, both of these actuators will be energized and both switches 11 and 12 will be raised. This will break the connection to the actuator 6 and close a circuit through the actuator 18, thus lowering the switch 7 and breaking the circuit through the actuator 3. This breaks the circuit to the motor 5ᵃ and stops the conveyor.

If, now, the attendant at station G¹ wishes to start the conveyor on its way again and have it stopped at station G³, he will set the selector contacts 28 and 29 to connect the actuator coils 55 and 56 with the collectors 36 and 38, respectively. He will then depress the starting button 22 momentarily, sending the conveyor on its way. If the track switches 27 and 26 are set as shown in Fig. 2, the conveyor will travel along until it reaches the analyzing position of stop station G³. When it reaches this position, the conditioning collectors 42 and 45 will cause the energization of the switch 53 as previously described in connection with stop station G¹, causing the bus bar sections 49 and 51 to be electrically connected with the bus bar L¹. In this position of the conveyor the bus bar sections 49 and 51 will be engaged by the collectors 38 and 36 and as these collectors are now connected with the actuators 55 and 56 these actuators will be energized and the conveyor will be stopped as described in connection with stop station G¹.

In a similar manner, if the switch 27 is set for "straight" and if the conveyor is at station G³ and the attendant desires to send it to station G² and cause it to stop there, he will set the selectors 28 and 29 so that the collectors 37 and 35 will be connected with the actuators 56 and 55, respectively, and will start the conveyor on its travel. The conveyor will pass by station G¹ as the selectors 28 and 29 are not set to stop at that station, and will travel over the straight portion of the switch 27 and into conditioning position with respect to station G². The conditioning apparatus will operate the switch 54, rendering the bus bar sections 52 and 50 effective for analysis. These sections 52 and 50 are so spaced and positioned that they will be engaged by the effective analyzing collectors 35 and 37, thus energizing both actuators 55 and 56 and stopping the travel motor 5ᵃ.

It is obvious that a system could be devised in which one of the conditioning collectors 42 or 45 might be dispensed with and that the analyzable bus bar sections might be placed in either one of the bus bar circuits L¹ or L².

I provide the two independently settable selective devices 28 and 29 which control, respectively, the two switches 11 and 12 in series which control the "stop" actuator of the latched-in switch and the "run" actutaor 18 of the latched-in switch 7 to enable a relatively large number of selectable analyzable combinations to be obtained, thus providing for a large number of stop stations. The series arrangement of these switches makes it necessary that both actuators be simultaneously energized to de-energize the "run" actuator 6 and energize the stop actuator 18.

If the travel motor 5ᵃ has been stopped by simultaneous energization of both actuators 55 and 56, the "run" actuator 6 cannot be energized again to maintain the motor in forward speed if either of the selectors 28 or 29 is set to left-hand position to connect either the actuator 55 or the actuator 56 with the conductor 23 leading to L¹, since if either of the actuators 55 or 56 is energized the circuit to the actuator 6 will be broken either by the switch 12 or the switch 11. This necessitates that both selectors 28 and 29 shall be set to stop-selecting position before the conveyor can proceed on its trip.

*Selective track switch control*

The track switch control apparatus is in many respects similar to the stop travel motor control apparatus. Two track switches 26 and 27 are shown, but as the control apparatus for the two switches differ somewhat in construction they will be separately described. The track switch 27 comprises a movable section 57 shiftable from a position in which the conveyor A travels straight ahead to a position in which it travels around a curve, and vice versa, by means of a suitable electric motor 58. This electric motor gets its power supply from the conductors 59 and 59ᵃ, the circuits being such that when the switch 60 is open and the switch 61 is closed, the motor is driven in a direction to shift the switch from straight to curved position, and that when the switch 61 is open and the switch 60 is closed the motor will operate in a reverse direction to move the switch from curved to straight position. The switch 60 is controlled by the actuator 62 which is connected with the power supply at 59ᵃ through the conductor 63, limit switch 64, and conductor 65 and is connected with a terminal of the conditioning switch 66 through a conductor 67. The actuator 68 for the switch 61 is connected with the power supply at 59ᵃ through the conductor 65, limit switch 69, and conductor 70 and is connected on the other side through the conductor 71 with a terminal on the conditioning switch 66. The limit switch 64 is automatically opened and the limit switch 69 is automatically closed when the switch section 57 is moved to "curved" position, and the switch 64 is automatically closed and the switch 69 opened when the section 57 is moved to the "straight" position.

The apparatus for controlling the operation of the track switches is similar to apparatus previously described for automatically stopping the travel of the motor 5ᵃ. It comprises the conditioning collectors 42, 45, etc., carried by the conveyor, already described in connection with the travel motor stop apparatus, the conditioning bus bar sections 72 and 73 at the track switch station H and an actuator 74 connected between these bus bar sections 72 and 73, the conditioning switch 66 controlled by this actuator, a plurality of analyzable bus bar sections 75, 76, 77, 78 and 79, some of which, 76, 78 and 79, are connected so as to be rendered analyzably effective by the closing of the switch 66, a conductor 80 connecting the bus bar section 76 with L¹ when the switch 66 is closed, and the conductors 67 and 71 connecting the actuators 62 and 68 with the bus bar sections 79 and 78 when the switch 66 is closed. The track switch control apparatus comprises also the conveyor-carried collectors 81, 82 and 83 engaging the bus bar L¹, the collector 81 being electrically connected with the movable contact of selector 25 and the collectors 82 and 83 being connected, respectively, with the fixed contacts 84 and 85 of the selector 25. With this construction, when the trolley in its travel reaches the track switch controlling station H, the collectors 42, 45, etc., will be in position so that the trolley 41 will engage the bus bar section 72 at the same time that the collector 46 engages the bus bar section 73. This will connect section 73 with the bus bar L¹ and the section 72 with bus bar L² and establish a circuit through the actuator 74 to close the switch 66. This will render analyzably effective the bus bar sections 76, 78 and 79.

If the attendant in dispatching the conveyor desires that it shall set the track switch 27 to "curve," he will position the movable selector contact of the selector 25 to engage the fixed contact 85. This electrically connects the collectors 81 and 83. When the conveyor has reached the switch-controlling conditioning position in which the bus bar sections 76, 78 and 79 are rendered selectably effective, the collector 81 will engage the section 76 and the collector 83 will engage the bus bar section 79. This will cause the actuator 62 to be energized to put the motor 58 into action to shift the switch section 57 from "straight" position to "curve" position, if the track switch section had been left in "straight" position. The circuit thus established for the actuator 62 is from L¹ through the conductor 80, switch 66, bus bar section 76, collector 81, conductor 87, the movable contact of the selector 25, the conductor 86, the collector 83, the bus bar section 79, switch 66, conductor 67, actuator 62, conductor 63, limit switch 64, and conductor 65 to the supply 59ª (L²). If the switch section 57 had already been in "curve" position the limit switch 64 would have been opened and the actuator 62 would not have been energized.

If, instead of desiring to send the conveyor along the curved portion of the switch section 57, the operator had desired to send the conveyor along the straight portion of the track switch, he would have set the movable contact of the selector 25 to engage the other fixed contact 84 of the selector 25, as shown in detail in Fig. 5, thus connecting the collector 81 with the collector 82. He would then dispatch the trolley on its way. With this setup, when the conveyor reached the conditioning track switch controlling position, the conditioning switch 66 would be closed automatically and the analyzable bus bar sections 76, 78 and 79 would be rendered analyzably effective. The selected collectors 81 and 82 would establish an electrical connection between the bus bar sections 76 and 78, thus connecting the actuator 68 between L¹ and L² at 59ª through a circuit including the conductor 80, the switch 66, the bus bar section 76, the collector 81, selector switch 25, collector 82, bus bar section 78, switch 66, conductor 71, actuator 68, conductor 70, limit switch 69, and a conductor 65 to the terminal 59ª (L²). This will close the switch 61, causing reverse rotation of the motor 55 to move the track switch 57 from "curve" to "straight" position. When the switch 60 is closed, the conductors 88 and 89 for the motor 58 are connected, respectively, with the terminals L¹ and L².

The apparatus for controlling the track switch 26 is in general similar to that described in connection with track switch 27. However, the track switch 27 is shown as approached by the conveyor from the "toe" end of the switch, and the track switch 26 is approached from the "heel" end. After the conveyor has passed the track switch 27, the switch is left in the position in which it was placed by the conveyor at the control station H. Each conveyor, as it reaches the control station H, has to insure that the track switch 27 be set to the desired position. On the other hand track switch 26 is always left in "curve" position by the conveyor after it has passed the switch. This makes it unnecessary to provide a switch controlling station on the curved track section 90. It is only necessary to provide a switch controlling station on the track section 91 to throw the switch 26 to "straight" position as the trolley approaches the switch on this track section. In the track switch controlling apparatus for the track switch 26, the motor 58, the switches 60 and 61, the switch actuators 62 and 68, and the limit switches 64 and 69 may be similar to those described in connection with track switch 27.

The apparatus for controlling the actuator 68 which sets the switch 26 to "straight" position, comprises an insulated bus bar section 92 in L¹ connected with the actuator 68 by conductor 93. As the conveyor reaches the control station for the track switch 26, the front collector 46 engages the bus bar section 92 and connects this bus bar section with L¹ through the bridging conductor 94 and the collectors 44 and 46. This establishes a circuit through the actuator 68 from L¹ through the collectors 44 and 46, bus bar section 92, the conductor 93, the actuator 68, the conductor 95, the limit switch 69 and conductor 96 to L² at 59ª. This pits the motor 58 in operation to move the switch to "straight" position. As the conveyor proceeds, it passes through the switch until the front collector 46 engages the insulated bus bar section 97. This energizes the actuator 62 and closes the switch 60 which causes reverse rotation of the motor 58 to reset the switch 57 to "curve" position. The circuit through the actuator 62 is from L¹ through the collectors 43 and 44, jumper conductor 94, collector 46, insulated bus bar section 97, conductor 98, actuator 62, conductor 99, limit switch 64 and conductors 100 and 96 to L² at 59ª.

It is obvious that the selector 25, when set, may control the throw of the track switches 26 and 27, irrespective of whether the conveyor is motor driven or pulled along by an attendant on the floor.

*Automatic blocking of conveyors*

Two blocking stations J and K are provided, one to enable a trolley travelling, for example, on the curved track section 90 to block a conveyor travelling, for example, on another curved track section 91, if the conveyor on the first curved track section 90 reaches the blocking station J before the conveyor travelling on the other curved track section 91 reaches the blocking section K, and one to enable a conveyor travelling on the curved section 91 to block a conveyor travelling on the curved track section 90, if the conveyor travelling on the section 91 reaches its blocking station K before the other conveyor reaches its blocking station J. To enable this blocking action to be accomplished, the bus bar sections 90 and 91 between the switches 26 and 27 are insulated from each other and from the rest of the bus bar system. Power is supplied to the insulated bus bar sections 90 and 91 from the connections at 101 and 102. The energization and de-energization of the bus bars for the curved bus bar section 91 is controlled by an electric actuator 103 and a switch 104 controlled thereby, and the energization and de-energization of the bus bars for the insulated bus bar section 90 is controlled by a switch 105 controlled by an electric actuator 106. The circuits for the electric actuators 103 and 106 are controlled by two-position latched-in switches 7a and 7b controlled by the electric actuators 6a, 18a, 6b and 18b.

When the switch 104 is closed, power is supplied to the bus bars of bus bar section 91 from the connections at 102 through the conductors $L^1$ and $L^2$, switch 104, and conductors 107 and 108. When the switch 105 is closed, the bus bars of the bus bar section 90 are supplied with power from the connections at 101 through the conductors $L^1$ and $L^2$, switch 105 and conductors 108 and 109. The switches 104 and 105 are normally closed and are opened by the energization of the actuators 103 and 106, respectively. The switches 7a and 7b are normally open, being opened by the actuators 18a and 18b, respectively, and closed by the actuators 6a and 6b, respectively. The actuators 18a and 18b are both connected with the insulated bus bar section 97 by conductors 110, 111 and 112 and are connected with $L^2$ by the conductors 113, 114 and 115. The actuator 6a is connected with $L^2$ by conductor 114 and is connected with an insulated control bus bar section 116 by conductor 117. The actuator 6b is connected with $L^2$ by conductors 118 and 115 and is connected with an insulated bus bar section 119 in $L^1$.

If there are two conveyors travelling along the trackway, one on bus bar section 90 and the other on bus bar section 91, and the conveyor on section 90 reaches the position where its control collector 46 engages the insulated bus bar section 116 before the collector 46 on the conveyor on bus bar section 91 engages the insulated control bus bar section 119, the actuator 6a will be energized, the switch 7a will be closed, the actuator 103 will be energized and the switch 104 will be opened. This will cut off the power supply to bus bar section 91 and the conveyor on bus bar section 91 will quickly come to a stop. The energization of the actuator 6a is effected by connecting the insulated bus bar section 116 with $L^1$ through the electrically connected collectors 46 and 45.

After the bus bars for the bus bar section 91 have been de-energized, they will remain de-energized until the conveyor on bus bar section 90 moves to a position where its collector 46 engages the insulated bus bar section 97. In this position the bus bar section will be electrically connected with $L^1$ through collectors 46 and 45. This closes the circuit through the actuator 18a, opening the switch 7a, de-energizing the actuator 103, allowing the switch 104 to close to again energize the bus bars for track section 91. The circuit established through the actuator 18a is from the connection at 102 through conductors 114 and 113, actuator 18a, conductors 110, 112, bus bar section 97, and collectors 46 and 45 to $L^1$.

Under a different set of conditions, with a conveyor on bus bar section 90 and another conveyor on bus bar section 91, if the conveyor on bus bar section 91 is in advance of the conveyor on bus bar section 90 so that its collector 46 engages the insulated bus bar section 119 before the collector 46 of the conveyor on bus bar section 90 engages the insulated bus bar section 116, the actuator 6b will be energized to close the switch 7b, thus energizing the actuator 106 to open the switch 105. This will de-energize the bus bars for bus bar section 90, causing the conveyor on bus bar section 90 to stop its travel. The bus bars corresponding to bus bar section 90 will remain de-energized until the conveyor on bus bar section 91 advances to a position where its collector 46 engages the bus bar section 97. This will establish a circuit through the actuator 18b, opening the switch 7b, de-energizing the actuator 103 and allowing the switch 105 to close to re-establish the circuit for the bus bars of the bus bar section 90.

Referring again to Fig. 1, it will be seen that by the apparatus described above, an attendant at dispatching station E can, for example, fill the carrier of the conveyor C with any desired mixture of the material in the supply means K, set the selector F so that it will throw a selection of the switches D to cause it to travel any desired route B and stop at any one of the desired stations G and initiate the travel of the conveyor so that it will choose its own path, follow the selected route and go to the selected delivery station G. It will also be seen that the attendant at the selected one of the delivery stations, after the load has been discharged from the conveyor, can reset the selector F to cause the conveyor to select its own route to any other delivery station or, if desired, back to the supply station. The track section $B^1$ may be utilized as a bypass to avoid sending the conveyor back to the dispatch station E if it should be desired, for example, to dispatch the conveyor from delivery station $G^1$ to delivery station $G^2$.

Further modifications will be apparent to those skilled in the art and it is desired, therefore, that the invention be limited only by the scope of the appended claims.

Having thus described my invention, what I claim and desire to secure by Letters Patent is:

1. A conveyor system comprising a conveyor for travelling along a trackway, a pair of energizable bus bars extending along said trackway for continuously supplying power to said conveyor as it travels along said trackway, and discriminatory collector means carried by said conveyor travelling along said bus bars, each of said bus bars having a control section interposed therein insulated from the adjacent sections, said collector means including a pair of bridging collectors for simultaneously connecting said control sections respectively with an adjacent section, and an electric actuator connected between the said control sections, the circuit through which is completed by said bridging collectors, a third control section interposed in one of said bus bars and insulated from adjacent sections, a connector controlled by said actuator for controlling the connection and disconnection between said third control section and one of said bus bars, said collector means comprising a collector so spaced with respect to said bridging collectors as to engage said third control section when the bridging collectors connect their control sections with adjacent bus bar sections.

2. A conveyor system comprising a conveyor for travelling along a trackway, a pair of energizable bus bars extending along said trackway for continuously supplying power to said conveyor as it travels along said trackway, and discriminatory collector means carried by said conveyor engaging and travelling along said bus bars, one of said bus bars having a control section interposed therein insulated from the adjacent sections, said collector means including a bridging collector for connecting said control section with an adjacent section, an electric actuator connected between the said control section and the nonadjacent bus bar, a circuit through which actuator is completed by the said bridging collector, a plurality of control sections interposed in one of said bus bars and insulated from each other and from adjacent sections, and a connector controlled by said actuator for controlling the connection and disconnection between said plurality of control sections and one of said bus bars, said collector means comprising a plurality of collectors so spaced with respect to said bridging collector as to engage said plurality of control sections when the bridging collector connects the first control section with an adjacent bus bar section.

3. A conveyor system comprising a conveyor for travelling along a trackway, a pair of energizable bus bars extending along said trackway for continuously supplying power to said conveyor as it travels along said trackway, and discriminatory collector means carried by said conveyor engaging and travelling along said bus bars, one of said bus bars having a control section interposed therein insulated from the adjacent sections, said collector means including a bridging collector for connecting said control section with an adjacent section, an electric actuator connected between the said control section and the nonadjacent bus bar, a circuit through which actuator is completed by the said bridging collector, a plurality of control sections interposed in one of said bus bars and insulated from each other and from adjacent sections, a connector controlled by said actuator for controlling the connection and disconnection between said plurality of control sections and one of said bus bars, said collector means comprising a plurality of collectors so spaced with respect to said bridging collector as to engage said plurality of control sections when the bridging collector connects the first control section with an adjacent bus bar section, and a switch connector for selective connection with any one of said plurality of collectors.

4. A conveyor for travelling along a trackway, a single bus bar having a plurality of interruptions therein extending along said trackway, a plurality of distinguishable bus bar sections interposed at said interruptions, respectively, and electrically insulated from the remainder of said bus bar, a plurality of independently analyzable and selectable partial circuits connected with said interposed sections, respectively, a collector carried by said conveyor continuously engageable with said bus bar and sequentially engageable with said interposed sections, and a plurality of analyzing and discriminatory circuit means carried by said conveyor selectively connectible with said collector, each of said analyzing circuit means being responsive to at least one of said interposed means and partial circuits to complete an effective circuit and nonresponsive to at least one other.

5. A conveyor for travelling along a trackway, a single bus bar means having a plurality of interruptions therein extending along said trackway, a plurality of distinguishable bus bar devices interposed at said interuptions, respectively, and electrically insulated from the remainder of said bus bar, a plurality of independently analyzable and selectable partial circuits connected with said interposed devices, respectively, collector and circuit means carried by said conveyor comprising collector means continuously engageable with said bus bar means and sequentially engageable with said interposed devices, and a plurality of analyzing and discriminatory circuit means carried by said conveyor selectively connectible in circuit with said collector means, each of said analyzing circuit means being responsive to at least one of said interposed devices and partial circuits to complete an effective circuit and nonresponsive to at least one other.

6. In a control system for a carrier operable over a predeterminable route having a plurality of stations distributed therealong, a control conductor having distinguishable sections individual to said stations and extending along said route, said distinguishable sections being electrically insulated from the remainder of said conductor, discriminatory control trolley means on said carrier continuously engageable with the principal portion of said control conductor and sequentially engageable with said sections, said trolley means being common to said stations, a station selector on the carrier operable to selectively condition said control trolley means in accordance with the station selected, said station selector being operable, to select a station, at any time during the approach of said carrier to the selected station, carrier control means for each station connected to the corresponding section and disposed to be energized from said control trolley means as the carrier approaches the corresponding station, and means operably responsive to said energization to control an operation affecting the carrier at the selected station.

7. Control apparatus for a telpherage system including a power-driven conveyor, a trackway for such conveyor and a plurality of operating stations located at spaced points along such trackway, said apparatus comprising an electric conductor extending along said trackway and having an interposed distinguishable section electrically insulated from the remainder of said conductor at each of said stations, trolley means mounted on said conveyor substantially continuously engageable with said conductor and sequentially engageable with said interposed sections, an electric translating device at each of said stations electrically connected to the corresponding interposed section for controlling an operation of said conveyor, and manually settable discriminatory control means mounted on said conveyor to condition said trolley means for selectively energizing one of said translating devices when said trolley engages the corresponding interposed section.

8. A trackway, a conveyor for travelling along said trackway, an electrical conductor extending along said trackway and having a plurality of spaced interposed distinguishable sections electrically insulated from the remainder of said conductor and from each other, trolley means on said conveyor substantially continuously engageable with said conductor and sequentially engageable with said interposed sections, a plurality of power-actuated devices located adjacent said interposed sections, a plurality of power supply controls therefor, each of said controls being connected to one of said interposed sections, and manually settable discriminatory selector means carried by said conveyor and associated with said trolley means for successively analyzing said controls as said conveyor travels along said trackway for selecting one of said controls for supplying power to the corresponding one of said power devices.

9. In a telpherage system, a carrier, a trackway along which said carrier travels, having a plurality of stations distributed therealong, a control conductor having distinguishable sections individual to said stations and extending along said route, said distinguishable sections being electrically insulated from the remainder of said conductor, control trolley means on said carrier substantially continuously engageable with said control conductor and sequentially engageable with said sections, a discriminatory station selector on the carrier operable to selectively condition said control trolley means in accordance with the station selected, said station selector being operable, to select a station, at any time during the approach of said carrier to the selected station, carrier control means for each station connected to the corresponding section and disposed to be energized from said control trolley means as the carrier approaches the corresponding station, and means operably responsive to said energization to control an operation affecting the carrier at the selected station.

10. In a control system for a carrier operable over a predeterminable route having a plurality of stations distributed therealong, a control conductor having distinguishable sections individual to said stations and extending along said route, said distinguishable sections being electrically insulated from the remainder of said conductor, control trolley means on said carrier substantially continuously engageable with said control conductor and sequentially engageable with said sections, a discriminatory station selector on the carrier operable to selectively condition said control trolley means in accordance with the station selected, said station selector being operable, to select a station, at any time during the approach of said carrier to the selected station, carrier control means for each station connected to the corresponding section and disposed to be energized from said control trolley means as the carrier approaches the corresponding station, and means operably responsive to said energization to control an operation affecting the carrier at the selected station comprising a propulsion motor for said conveyor.

11. In a control system for a carrier operable over a predeterminable route having a plurality of stations distributed therealong, a control conductor having distinguishable sections individual to said stations and extending along said route, said distinguishable sections being electrically insulated from the remainder of said conductor, control trolley means on said carrier substantially continuously engageable with said control conductor and sequentially engageable with said sections, a discriminatory station selector on the carrier operable to selectively condition said control trolley means in accordance with the station selected, said station selector being operable, to select a station, at any time during the approach of said carrier to the selected station, carrier control means for each station connected to the corresponding section and disposed to be energized from said control trolley means as the carrier approaches the corresponding station, and means operably responsive to said energization to control an operation affecting the carrier at the selected station comprising a propulsion motor for said conveyor, said control conductor being in the power circuit of said motor.

12. In a control system for a carrier operable over a predeterminable route having a plurality of stations distributed therealong, a control conductor having distinguishable sections individual to said stations and extending along said route, said distinguishable sections being electrically insulated from the remainder of said conductor, control trolley means on said carrier substantially continuously engageable with said control conductor and sequentially engageable with said sections, a discriminatory station selector on the carrier operable to selectively condition said control trolley means in accordance with the station selected, said station selector being operable, to select a station, at any time during the approach of said carrier to the selected station, carrier control means for each station connected to the corresponding section and disposed to be energized from said control trolley means as the carrier approaches the corresponding station, and means operably responsive to said energization to control an operation affecting the carrier at the selected station, said trackway comprising a plurality of track switches adjacent a plurality of said stations, respectively, said energization responsive means comprising motors for said track switches, respectively.

13. In a control system for a carrier operable over a predeterminable route having a plurality of stations distributed therealong, a control conductor having distinguishable sections individual to said stations and extending along said route, said distinguishable sections being electrically insulated from the remainder of said conductor, control trolley means on said carrier substantially continuously engageable with said control conductor and sequentially engageable with said sections, a discriminatory station selector on the carrier operable to selectively condition said control trolley means in accordance with the station selected, said station selector being operable, to select a station, at any time during the approach of said carrier to the selected station, carrier control means for each station connected to the corresponding section and disposed to be energized from said control trolley means as the carrier approaches the corresponding station, and means operably responsive to said energization to control an operation affecting the carrier at the selected station comprising an electric translating device mounted on said carrier.

14. In a control system for a carrier operable over a predeterminable route having a plurality of stations distributed therealong, a control conductor having distinguishable sections individual to said stations and extending along said route, said distinguishable sections being electrically insulated from the remainder of said conductor, control trolley means on said carrier substantially continuously engageable with said control conductor and sequentially engageable with said sections, a discriminatory station selector on the carrier operable to selectively condition said control trolley means in accordance with the station selected, said station selector being operable, to select a station, at any time during the approach of said carrier to the selected station, carrier control means for each station connected to the corresponding section and disposed to be energized from said control trolley means as the carrier approaches the corresponding station, and means operably responsive to said energization to control an operation effecting the carrier at the selected station comprising a plurality of translating devices adjacent a plurality of said stations, respectively.

15. A trackway, a conveyor for travelling along said trackway, a power bus bar extending alongside said trackway, having a plurality of interruptions therein located at spaced distinguishable selectee stations alongside said trackway, a plurality of distinguishable selectee bus bar means, one of said means being interposed at an interruption of said power bus bar and insulated therefrom at each of said stations, said bus bar means being in alignment with respect to said power bus bar, discriminatory control collector means carried by said conveyor and guided to engage said power bus bar substantially continuously and to engage sequentially said interposed bus bar means as the collector means travel, manually settable selector means carried by said conveyor operable to selectively condition said discriminatory control collector means, in accordance with the bus bar means of the selectee station chosen, for effective completion of a control circuit including said bus bar means and said collector means on engagement of the collector means with the bus bar means of the chosen station, and means included in said control circuit operably responsive to said effective completion of said circuit to control an operation affecting the conveyor at the selected station.

16. A trackway, a conveyor for travelling along said trackway, a power bus bar extending alongside said trackway, having a plurality of interruptions therein located at spaced distinguishable selectee stations alongside said trackway, a plurality of distinguishable selectee collector engageable means, one of said means being interposed at an interruption of said power bus bar means and insulated therefrom at each of said stations, said collector engageable means being in alignment with respect to said power bus bar, discriminatory control collector means carried by said conveyor and guided to engage said power bus bar substantially continuously and to engage sequentially said interposed collector engageable means as the collector means travel, manually settable selector means carried by said conveyor operable to selectively condition said discriminatory control collector means, in accordance with the differentiated selectee collector engageable means of the station selected, for effective completion of a control circuit including said bus bar means and said collector means on engagement of the collector means with the collector engageable means of the chosen station, and means included in said control circuit operably responsive to said effective completion of said circuit to control an operation affecting the conveyor at the selected station.

17. A conveyor for travelling along a trackway, a power bus bar extending alongside said trackway, having a plurality of interruptions therein located at spaced distinguishable selectee stations alongside said trackway, a plurality of distinguishable selectee collector engageable means, one of said means being interposed at an interruption of said power bus bar means and insulated therefrom at each of said stations, said collector engageable means being in alignment with respect to said power bus bar, discriminatory control collector means carried by said conveyor and guided to engage said power bus bar substantially continuously and to engage sequentially said interposed collector engageable means as the collector means travel, manually settable selector means carried by said conveyor operable to selectively condition said discriminatory control collector means, in accordance with the differentiated selectee collector engageable means of the station selected, for effective completion of a control circuit including said bus bar means and said collector means on engagement of the collector means with the collector engageable means of the chosen station, and means included in said control circuit operably responsive to said effective completion of said circuit to control an operation affecting the conveyor at the selected station.

18. A trackway, a conveyor for travelling along said trackway, a power bus bar extending alongside said trackway, having a plurality of interruptions therein located at spaced distinguishable selectee stations alongside said trackway, a plurality of distinguishable selectee collector engageable means, one of said means being interposed at an interruption of said power bus bar means and insulated therefrom at each of said stations, said collector engageable means being in alignment with respect to said power bus bar, discriminatory control collector means carried by said conveyor and guided to engage said power bus bar substantially continuously and to engage sequentially said interposed collector engageable means as the collector means travel, manually settable selector means carried by said conveyor operable to selectively condition said discriminatory control collector means, in accordance with the differentiated selectee collector engageable means of the station selected, for effective completion of a control circuit including said bus bar means and said collector means on engagement of the collector means with the collector engageable means of the chosen station, and means included in said control circuit operably responsive to said effective completion of said circuit to control an operation affecting the conveyor at the selected station, including an electric translating device carried by said conveyor.

19. A trackway, a conveyor for travelling along said trackway, a power bus bar extending alongside said trackway, having a plurality of interruptions therein located at spaced distinguishable selectee stations alongside said trackway, a plurality of distinguishable selectee collector engageable means, one of said means being interposed at an interruption of said power bus bar means and insulated therefrom at each of said stations, said collector engageable means being in alignment with respect to said power bus bar, discriminatory control collector means carried by said conveyor and guided to engage said power bus bar substantially continuously and to engage sequentially said interposed collector engageable means as the collector means travel, manually settable selector means carried by said conveyor operable to selectively condition said discriminatory control collector means, in accordance with the differentiated selectee collector engageable means of the station selected, for effective completion of a control circuit including said bus bar means and said collector means on engagement of the collector means with the collector engageable means of the chosen station, and means included in said control circuit operably responsive to said effective completion of said circuit to control an operation affecting the conveyor at the selected station, including an electric translating device located at the selected station.

20. A trackway, a conveyor for travelling along said trackway, a power bus bar extending alongside said trackway, having a plurality of interruptions therein located at spaced distinguishable selectee stations alongside said trackway, a plurality of distinguishable selectee collector engageable means, one of said means being interposed at an interruption of said power bus bar means and insulated therefrom at each of said stations, said collector engageable means being in alignment with respect to said power bus bar, discriminatory control collector means carried by said conveyor and guided to engage said power bus bar substantially continuously and to engage sequentially said interposed collector engageable means as the collector means travel, manually settable selector means carried by said conveyor operable to selectively condition said discriminatory control collector means, in accordance with the differentiated selectee collector engageable means of the station selected, for effective completion of a control circuit including said bus bar means and said collector means on engagement of the collector means with the collector engageable means of the chosen station, and means included in said control circuit operably responsive to said effective completion of said circuit to control an operation affecting the conveyor at the selected station, including an electric translating device carried by said conveyor for propelling it.

21. A trackway, a conveyor for travelling along said trackway, a power bus bar extending alongside said trackway, having a plurality of interruptions therein located at spaced distinguishable selectee stations alongside said trackway, a plurality of distinguishable selectee collector engageable means, one of said means being interposed at an interruption of said power bus bar means and insulated therefrom at each of said stations, said collector engageable means being in alignment with respect to said power bus bar, discriminatory control collector means carried by said conveyor and guided to engage said power bus bar substantially continuously and to engage sequentially said interposed collector engageable means as the collector means travel, manually settable selector means carried by said conveyor operable to selectively condition said discriminatory control collector means, in accordance with the differentiated selectee collector engageable means of the station selected, for effective completion of a control circuit including said bus bar means and said collector means on engagement of the collector means with the collector engageable means of the chosen station, and means included in said control circuit operably responsive to said effective completion of said circuit to control an operation affecting the conveyor at the selected station, including a plurality of electric translating devices located at said stations, respectively, and a plurality of trackway switches controlled by said translating devices.

22. In a telpherage system, a power driven conveyor, a trackway for said conveyor, a first electric translating device mounted on said conveyor, a power bus bar extending alongside said trackway and having a plurality of interruptions therein located at spaced points along said trackway, a plurality of distinguishable bus bar means, said bus bar means being interposed at said interruptions at said spaced points and being in alignment with respect to and insulated from said power bus bar, a plurality of electric translating devices located alongside said trackway and electrically connected to said bus bar means, discriminatory control collector means carried by said conveyor and substantially continuously engageable with said power bus bar and sequentially engageable with said bus bar means, said collector means being electrically connected to said first translating means, first manually settable selector means carried by said conveyor operable to selectively condition said control collector means to control said first translating device when said collector means engages a selected one of said bus bar means, and second manually operable to selectively condition said control collector means to control a selected one of said plurality of translating devices when said collector means engages the corresponding one of said bus bar means.

23. In a telpherage system, a power driven conveyor, a trackway for said conveyor, a first electric translating device mounted on said conveyor, a power bus bar extending alongside said trackway and having a plurality of interruptions therein located at spaced points along said trackway, a plurality of distinguishable bus bar means, said bus bar means being interposed at said interruptions at said spaced points and being in alignment with respect to and insulated from said power bus bar, a plurality of electric translating devices located alongside said trackway and electrically connected to a plurality of said bus bar means, a plurality of power supply controls electrically connected to others of said bus bar means, discriminatory control collector means carried by said conveyor and substantially continuously engageable with said power bus bar and sequentially engageable with said bus bar means, said collector means being electrically connected to said first translating means, first manually settable selector means carried by said conveyor operable to selectively condition said control collector means to control said first translating device when said collector means engages a selected one of said bus bar means to which one of said power supply controls is connected, and second manually settable control means mounted on said conveyor operable to selectively condition said control collector means to control a selected one of said plurality of translating devices when said collector means engages the corresponding one of said bus bar means.

24. A trackway, a conveyor for travelling along said trackway, a power bus bar extending along said trackway, a plurality of spaced distinguishable selectee stations located alongside said trackway, said power bus bar having a plurality of interruptions therein individual to said stations, a plurality of distinguishable selectee electrical connecting means located adjacent said stations and arranged substantially in alignment with said power bus bar at said interruptions and insulated therefrom, discriminatory control collector means carried by said conveyor and guided to engage and cooperate with said power bus bar substantially continuously and to engage and cooperate with said electrical connecting means sequentially as the collector means travel, manually settable selector means carried by said conveyor operable to selectively condition said discriminatory control collector means, in accordance with the electrical connecting means of the selected station, for effective actuation of a control circuit including said electrical connecting means upon engagement of the collector means with the electrical connecting means of the chosen station, and means included in said control circuit operably responsive to effective completion of said circuit to control an operation affecting the conveyor at the selectee station.

25. A conveyor for travelling along a trackway, a power bus bar extending along said trackway, a plurality of spaced distinguishable selectee stations located alongside said trackway, said power bus bar having a plurality of interruptions therein individual to said stations, a plurality of distinguishable selectee electrical connecting means located adjacent said stations and arranged substantially in alignment with said power bus bar at said interruptions and insulated therefrom, discriminatory control collector means carried by said conveyor and guided to engage and cooperate with said power bus bar substantially continuously and to engage and cooperate with said electrical connecting means sequentially as the collector means travel, manually settable selector means carried by said conveyor operable to selectively condition said discriminatory control collector means, in accordance with the electrical connecting means of the selected station, for effective actuation of a control circuit including said electrical connecting means upon engagement of the collector means with the electrical connecting means of the chosen station, and means included in said control circuit operably responsive to effective completion of said circuit to control an operation affecting the conveyor at the selectee station.

26. In a conveyor system of the type wherein self-propelled electrically powered driving units travel along endless connecting uni-directional conveyor lines and have a plurality of possible destinations in such lines along a plurality of routes, and wherein the movement of said driving units from given points in said conveyor system to various destinations may require automatically controlled intermittent stopping and starting of said driving units as well as automatically controlled movement of track switches, means for dispatching said driving units to predetermined destinations characterized by a control system including a continuous constantly energized electrical power supply throughout said conveyor lines, collector means associated with each driving unit for receiving said power, a separate control conductor extending throughout said conveyor lines, and separate collector means for contacting said control conductor, said control conductor being provided with a plurality of insulated electrical contact members in the path of said last-mentioned collector means capable of momentarily completing an electrical circuit upon being contacted by said collector means thereby providing non-selective electrical signals in response to the passing of said driving units.

27. In a conveyor system of the type wherein self-propelled electrically powered driving units travel along endless connecting uni-directional conveyor lines and have a plurality of possible destinations in such lines along a plurality of routes, and wherein the movement of said driving units from given points in said conveyor system to various destinations may require automatically controlled intermittent stopping and starting of said driving units as well as automatically controlled movement of track switches, means for dispatching said driving units to predetermined destinations characterized by a control system including a continuous constantly energized electrical power supply throughout said conveyor lines, collector means associated with each driving unit for receiving said power, a separate control conductor extending throughout said conveyor lines, and separate collector means for contacting said control conductor, said control conductor being provided with a plurality of insulated sections capable of being independently energized and deenergized and otherwise adapted for use in stopping and starting said driving units, and said control conductor being also provided with a plurality of insulated electrical contact members in the path of said last-mentioned collector means capable of momentarily completing an electrical circuit upon being contacted by said collector means thereby providing non-selective electrical signals in response to the passing of said driving units.

28. In a control system for a plurality of carriers operable along a predeterminable route along which a plurality of stations are located at each of which a control operation may be performed, selective control means on at least one carrier which is common to all said stations, a station control means for each station disposed to be electrically coupled to said control means as the carrier approaches the corresponding station and be actuated by said coupling to effect a said control operation, additional control means disposed to be electrically coupled to said selective control means as said one carrier moves along said route and be actuated by said coupling, and means operably responsive to said last-mentioned actuation for controlling another said carrier.

29. In a conveyor system of the type wherein self-propelled electrically powered driving units travel along endless connecting uni-directional conveyor lines and have a plurality of possible destinations in such lines along a plurality of routes, and wherein the movement of said driving units from given points in said conveyor system to various destinations may require automatically controlled intermittent stopping and starting of said driving units as well as automatically controlled movement of track switches, means for dispatching said driving units to predetermined destinations characterized by a control system including a continuous constantly energized electrical power supply throughout said conveyor lines, collector means associated with each driving unit for receiving said power, a separate control conductor extending throughout said conveyor lines, and separate collector means for contacting said control conductor, said control conductor being provided with a plurality of insulated sections capable of being independently energized and deenergized and otherwise adapted for use in stopping and starting said driving units.

References Cited in the file of this patent

UNITED STATES PATENTS

| Number | Name | Date |
|---|---|---|
| 1,297,680 | Hanak | Mar. 18, 1919 |
| 1,379,614 | Bennington | May 31, 1921 |
| 1,381,317 | Loughridge | June 14, 1921 |
| 1,487,315 | Connely | Mar. 18, 1924 |
| 2,201,013 | Rosenthal | May 14, 1940 |
| 2,486,221 | Spafford | Oct. 25, 1949 |